(12) United States Patent
Gruenfelder

(10) Patent No.: US 12,455,998 B2
(45) Date of Patent: Oct. 28, 2025

(54) APPARATUS FOR GENERATING A LAYOUT FOR AN ADDITIVE MANUFACTURING OF AN ELECTRIC DRIVE

(71) Applicant: HENSOLDT Sensors GmbH, Taufkirchen (DE)

(72) Inventor: Michael Gruenfelder, Wang (DE)

(73) Assignee: HENSOLDT Sensors GmbH, Taufkirchen (DE)

( * ) Notice: Subject to any disclaimer, the term of this patent is extended or adjusted under 35 U.S.C. 154(b) by 443 days.

(21) Appl. No.: 17/889,156

(22) Filed: Aug. 16, 2022

(65) Prior Publication Data
US 2023/0047173 A1 Feb. 16, 2023

(30) Foreign Application Priority Data

Aug. 16, 2021 (EP) ..................................... 21191488

(51) Int. Cl.
| | |
|---|---|
| *G06F 30/392* | (2020.01) |
| *H02K 15/02* | (2006.01) |
| *G06F 113/10* | (2020.01) |
| *G06F 115/12* | (2020.01) |

(52) U.S. Cl.
CPC ........... *G06F 30/392* (2020.01); *H02K 15/02* (2013.01); *G06F 2113/10* (2020.01); *G06F 2115/12* (2020.01)

(58) Field of Classification Search
USPC ........................................ 716/110, 118, 119
See application file for complete search history.

(56) References Cited

U.S. PATENT DOCUMENTS

2019/0260252 A1\* 8/2019 Lambourne ............ H02K 19/02

FOREIGN PATENT DOCUMENTS

| KR | 20180073102 A | 7/2018 | |
|---|---|---|---|
| WO | 2018031186 A1 | 2/2018 | |
| WO | WO-2018223043 A1 \* | 12/2018 | ........... B29C 64/124 |

OTHER PUBLICATIONS

European Patent Office, Extended European Search Report, Application No. 21191488.2, dated Feb. 1, 2022, 12 pages.
European Patent Office, Office Action, EP Application No. 21191488.2, mailed Mar. 19, 2024, 7 pages.

\* cited by examiner

*Primary Examiner* — Brian Ngo
(74) *Attorney, Agent, or Firm* — Mahamedi IP Law LLP

(57) ABSTRACT

An apparatus for generating a layout for an additive manufacturing of an electric drive for a disc rotor. The disc rotor is adapted for being driven by a magnetic field. The apparatus comprises an input module configured to receive one or more input parameters. The apparatus further comprises a generating module configured to generate, from the one or more input parameters, a layout of a plurality of coil structures, wherein the plurality of coil structures is adapted to generate the magnetic field by an electric current, and a layout of a control structure, wherein the control structure is adapted to connect the plurality of coil structures with a connector for a supply of the electric current, and to distribute the electric current to the plurality of coil structures in order to drive the disc rotor.

10 Claims, 7 Drawing Sheets

(a)

(b)

(c)

APPARATUS FOR GENERATING A LAYOUT FOR AN ADDITIVE MANUFACTURING OF AN ELECTRIC DRIVE

TECHNICAL FIELD

The present invention relates to an apparatus and a method for generating a layout for an additive manufacturing of an electric drive, and in particular to a procedure for manufacturing an additive manufactured electric drive assisted by a parametric computer-aided design model.

BACKGROUND

Additive manufacturing may be employed to create both components and support structure of electronic circuits. In order to assemble miniature structures, a device for performing such an additive manufacturing (a 3D printer), is required to deposit materials with very different physical properties at precise locations. An example for such a device is provided by a multi-material jetting printer. Such a printer is able to process metallic and ceramic powders, homogeneously distributed in a thermoplastic binder to form a liquid, which the printer can deposit in very small quantities with high precision.

An emerging application for this type of 3D ink printing is the additive manufacturing of printed circuit boards, PCBs, where a PCB substrate is created simultaneously with at least certain parts of electronic components. This process admits a much more thorough connection of a component with the PCB substrate, as the combined structure is effectively cast as a single 3D configuration.

In a step preceding the actual printing, the process requires a generation of a layout of a component situated within (and/or on top of) the support structure. The layout must then be translated into commands that the printer can handle. Ideally, the layout should incorporate characteristics of the printing process, including characteristics of the employed material, or parameters of construction which are achievable by the printer.

A particular instance of such a process is aimed at integrating an electric drive of a disc motor. In the state of the art, electric drives implemented on conventional PCB may either be surface-mounted, or they may comprise a plurality of arrangements of essentially triangular, concentric electric lines, printed in a conventional way on surfaces of one or more layers which are then stacked on top of each other to form the circuit board. This conventional printing method usually generates the electric lines by an etching of a copper stratum. For each arrangement of concentric electric line contours, electric lines on successive layers are then connected by vias, miniature conductive pathways drilled into the PCB to establish electrical connectivity between the different PCB layers, in order to form a coil structure. A current through the electric lines yields a magnetic field which drives a disc rotor supported on the surface of the PCB.

Conventional PCBs are usually designed with dedicated layout software, in particular receiving a user input by means of e.g. a graphic design program for functional specifications of the integrated circuit. However, merely adapting these programs forfeits many of the advantages additive manufacturing with a multi-material jetting printer has to offer. This applies in particular to the creation of a coil arrangement for an electric drive, where the 3D printer is supposed to generate complete 3D coil structures, rather than a stack of plane layers.

Therefore there exists a demand for supporting a layout process in order to create an electric motor in a process of additive manufacturing. This comprises the technical task of generating a feasible layout, i.e. one which can be implemented by the process of additive manufacturing.

BRIEF DESCRIPTION OF THE INVENTION

At least some of the above-mentioned problems are solved by an apparatus, a method, a machine-readable storage device, a method for manufacturing, and an electric drive, as claimed. The dependent claims refer to further advantageous realizations for the subject matters of the independent claims.

The present invention relates to an apparatus for generating a layout for an additive manufacturing of an electric drive for a disc rotor. The disc rotor is adapted for being driven by a magnetic field, which is to be generated by the electric drive. The apparatus comprises an input module, configured to receive, from a user, one or more input parameters. The apparatus further comprises a generating module, configured to generate, from the one or more input parameters, a layout of a plurality of coil structures. The plurality of coil structures is adapted to generate the magnetic field by an electric current. The generating module is further configured to generate a layout of a control structure, wherein the control structure is adapted to connect the plurality of coil structures with a connector for supplying the electric current, and to distribute the electric current to the plurality of coil structures in order to drive the disc rotor.

Additive manufacturing of the electric drive implies in particular a deposition of at least one electrically conducting and one electrically insulating material. The two materials will in general show different characteristics with respect to their use in additive manufacturing. In generating the layout, the generating module includes constraints arising for the additive manufacturing of the electric drive. This includes in particular achievable resolutions in horizontal printing layers and in a respective vertical direction, and requirements like minimal distances between conducting portions of the electric drive to achieve proper insulation. The constraints may depend on technical arrangements (e.g. sizes and proportions, architecture) of a device employed for the additive manufacturing, but in particular arise from the different materials. The apparatus may be configured to implement the constraints in the input module by restricting possible values of input parameters. The apparatus may further be configured to implement the constraints in the generating module by enforcing bounds on particular parts of the layout (like e.g. a proximity of conducting structures). The layout may further include data to be respected in the additive manufacturing process, such as waiting times after particular printing steps.

The input parameters specify a size and a shape of the electric drive. Advantageously, the user only has to provide a small number of input parameters (e.g., seven scalar values) to the input module. Based on the input parameters, the generating module generates a layout, i.e. visual representations of an architecture, of the electric drive.

The generating module and/or the input module may be configured to ensure that the input parameters collectively yield a physically feasible layout. This may in particular be based on indicating ranges for feasible values of the input parameters to the user. The range of an input parameter may depend on one or more inputs of the user for other input parameters.

A coil structure is an additively manufactured structure that effectively provides the functionality of a coil. If this description makes reference to "coils", "wires", "lines" or similar entities, it is understood that the respective structure is additively manufactures (rather than e.g. wound, or drawn).

The generating module is advantageously adapted to generate the layout such that it admits creating the electric drive together with a support structure, like a PCB, in an additive manufacturing process, as e.g. in a multi-material jetting printer. The support structure may comprise a dielectric material, e.g. a plastic or compound typically used as a substrate in a PCB. The support structure may encase the plurality of coil structures and/or the control structure, either completely or in parts. The generating module may be configured to also include in the layout further features of a shape of the support structure. The layout may in particular provide a feature like e.g. a basin and/or a supporting pin, such that the support structure is better adapted to support the disc rotor.

Optionally the generating module is further configured to generate, based on the layout of the plurality of coil structures and on the layout of the control structure, instruction data for an additive manufacturing device. While the layouts can be purely visual representations of the electric drive, the generating module may be configured to translate the layouts into instruction data, i.e. suitable commands for operating the additive manufacturing device. The instruction data may in particular be output as electronic data.

Optionally the additive manufacturing device is a multi-material jetting printer. In this case the apparatus is configured to include constraints arising from a manufacturing method and from materials employed by the multi-material jetting printer. In embodiments, the multi-material jetting printer employs an electrically conductive ink and a dielectric ink requiring specific margins, tolerances, and bound. The constraints may in particular comprise:
  a minimal distance (resolution) in a horizontal printing plane,
  a minimal height of a printing layer, i.e. a resolution in a direction vertical to a horizontal plane,
  a maximal overall height of an object to be printed, i.e. a maximal distance in said vertical direction,
  a maximal extent of the object to be printed in a direction within the horizontal plane.

In particular a specific resolution subjects the layout to constraints, as conducting portions, like e.g. wires, are required to maintain a minimal distance in order not to interfere. The printing inks, and in particular the conductive ink, are usually not printable on arbitrarily fine scales, which may further affect an achievable printing resolution.

Although the construction space of the multi-material jetting printer is usually restricted, and a miniaturization may be in a focus of applications, the layout apparatus may be configured also for layouts of large-scale motors.

Optionally the input parameters comprise one or more of the following: a wire gauge or diameter of an electric line that constitutes the coil structures; a pitch or wire inclination relative to plane, e.g. to the plane defined by the disc rotor; a number of windings of an electric line in a coil layer of a coil structure. The input parameters may further comprise a radius or diameter of a cross section of each coil structure, or of at least one of the coil layers of each coil structure, wherein a coil layer may e.g. be given by a wire helix wrapping a coil body of the coil structure. The input parameters may further comprise a distance between coil structures or between at least one of the coil layers of each coil structure; a number of coil layers; and/or a distance between coil layers of a coil structure.

According to embodiments the wire of the coil structure is inclined relative to a main surface (e.g. of a printed circuit board utilized for the exemplary printed motor), wherein the term "inclined" may be understood as a continuous inclination by a predetermined inclination angle defining the pitch (e.g. a constant angle or constant pitch). By this, a helix is formed. Therefore, according to embodiments, the wire of the coil is not formed along planes connected by vertical interconnects (vias), but is formed along a helix, which in sections cannot be approximated by flat surfaces.

Optionally each coil structure comprises, as coil layers, one or more concentric wire helices, and each wire helix forms a coil layer around a coil body. Each coil layer has a cross section of (or admits a projection onto) a triangle with rounded corners. The generating module may be configured to generate each wire helix based on projecting a circular helix (i.e. a helix which projects onto a circle) onto a surface of a respective coil layer. This coil layer surface may be a lateral area of a coil body with a triangular base area, or more generally with a base area of some advantageously non-rotationally symmetric shape. The wire helix is comprised within the surface. In embodiments, a height of the coil layer surface is given by a height of the round coil, which in turn may be obtained from a number of windings times a pitch.

Advantageously, the projection is performed by means of a rotating projection line, which is located parallel to the cross section of the coil layer, and which has an edge passing both through a center point of the coil layer cross section and, at a right angle, through the circular helix.

In embodiments, the layout generating module in a first step comprises generating a round coil, or more precisely a circular helix, with the required diameter, pitch and number of revolutions. This may e.g. be performed by a spline or a sweeping, i.e. by generating a path (for a wire to be projected) and a cross section, and by basically extruding the cross section along the path. The more complex form of the wire helix is then obtained in a second step, which comprises projecting the circular helix along a projection line which runs parallel to a cross section of the coil and extends orthogonally from an axis of the round coil to the coil layer surface, and rotating the projection line around said axis, following the circular helix. The projection may comprise further measures, in particular for correctly generating the cross sectional profile of the wire of the wire helix, i.e. the term "projection line" is to be interpreted broadly.

An advantage of this method employing a rotating projection line is that arbitrary wire helices may be obtained by projecting onto corresponding coil layer surfaces. In further embodiments, coil layer surfaces are e.g. lateral surfaces of bodies with rectangular or square cross sections. A further advantage is that this method only requires a comparatively low number of input parameters, in particular due to starting from a common basis of a simple round coil structure.

Optionally the generating module is configured to generate, for each coil structure, a connection between respective ends of any two consecutive concentric wire helices by means of a spline function. In embodiments, an endpoint of a first wire helix lies in a plane perpendicular to the longitudinal axis of the wire helix. The endpoint of the first helix is connected to a starting point of a second helix, which forms a consecutive coil layer of the coil structure. The connection is generated by fitting a spline function, which interpolates between the endpoint of the first helix and the starting point of the second helix and is confined to said plane. This form of connecting the first and the second wire helix may then be repeated for all coil layers of the coil structure.

Optionally the plurality of coil structures is divided into pairs, and the control structure comprises a wiring which links, for each pair, a first member of the pair to a second member of the pair, and to the connector for the power supply. This wiring is designed such that the coil structures generate, by the electric current, a time-varying magnetic field which is adapted to drive the disc rotor. Several schemes for achieving a driving of the disc rotor by the magnetic field are known in the state of the art, and may be implemented by the generating module.

Embodiments further relate to a method for generating a computer aided design layout for an additive manufacturing of an electric drive for a disc rotor adapted for being driven by a magnetic field. The method comprising the following steps:

providing one or more input parameters, generating, from the one or more input dimensions, a layout of a plurality of coil structures, wherein the plurality of coil structures is adapted to generate the magnetic field by an electric current, and a layout of a control structure, wherein the control structure is adapted to connect the plurality of coil structures with a connector for supplying the electric current, and to distribute the electric current to the plurality of coil structures in order to drive the disc rotor.

Optionally, the step of generating the layout of the plurality of coil structures comprises, for at least one coil structure:

generating a round wire helix, wherein a pitch and/or a wire gauge and/or a number of revolutions is determined from provided input parameters, generating a rotating projection line which is parallel to a cross section of a coil body, wherein the coil body has a triangular cross section of with rounded corners, projecting the round wire helix onto a scaled surface of the coil body by means of the rotating projection line, generating a connection between respective ends of two consecutive concentric helices by means of a spline function.

The method may also be computer-implemented. A person of skill in the art will readily recognize that steps of the method may be performed by programmed computers. Embodiments are also intended to cover program storage devices, e.g. digital data storage media, which are machine-readable or computer-readable and encode a machine-executable or computer-executable program of instructions, wherein the instructions perform some or all of the steps of the above-described method when executed on the computer or processor.

Embodiments also relate to a method for manufacturing an electric drive for a disc rotor, wherein the disc rotor is adapted for being driven by a magnetic field and the method comprises a step of generating a layout by means of an apparatus as presented above.

Embodiments further relate to an electric drive for a disc rotor adapted for being driven by a magnetic field, wherein the electric drive has been manufactured by this method, i.e. where the manufacturing of the electric drive involved generating a layout as presented above.

Important aspects of the present invention may be summarized as follows: By means of the layout generated in the apparatus, a printed motor may be manufactured very compactly. It may be printed directly within and/or on a surface of a PCB. There is no need to wind coils. In particular, it is possible to integrate the motor into the PCB. The apparatus provides a programmable mechanical computer-aided design, MCAD, model of an electric drive, which allows creating CAD models of a brushless direct current disc motor, dependent on parameters. The apparatus admits an input of input parameters of the disc motor, such as wire diameter or thickness, a number of revolutions, etc. The coil structures, as well as the wiring between them, are adapting to the given input parameters.

Advantages of the invention include a semi-automatic creation of MCAD models of a printed disc motor. The apparatus and the method reduce the time needed to create the CAD model of the disc motor, and facilitate a fitting of dimensional requirements. The electric motor can be printed into or on a PCB in a very flat and compact way, realizing in particular pitches of electric conductors (wires) and other 3D features which are not achievable by the layer architecture of a common PCB. In particular, the apparatus generates a layout satisfying all requirements to be technically feasible, i.e. printable by a corresponding printing device, in particular by a multi-material jetting printer.

BRIEF DESCRIPTION OF THE FIGURES

Various embodiments of the present invention will be described in the following by way of examples only, and with respect to the accompanying drawings, in which.

DETAILED DESCRIPTION

Various examples will now be described more fully with reference to the accompanying drawings in which some examples are illustrated.

Accordingly, while examples are capable of various modifications and alternative forms, the illustrative examples in the figures will herein be described in detail. It should be understood, however, that there is no intent to limit examples to the particular forms disclosed, but on the contrary, examples are to cover all modifications, equivalents, and alternatives falling within the scope of the disclosure.

The terminology used herein is for the purpose of describing illustrative examples only and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements and/or components, but do not preclude the presence or addition of one or more other features, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
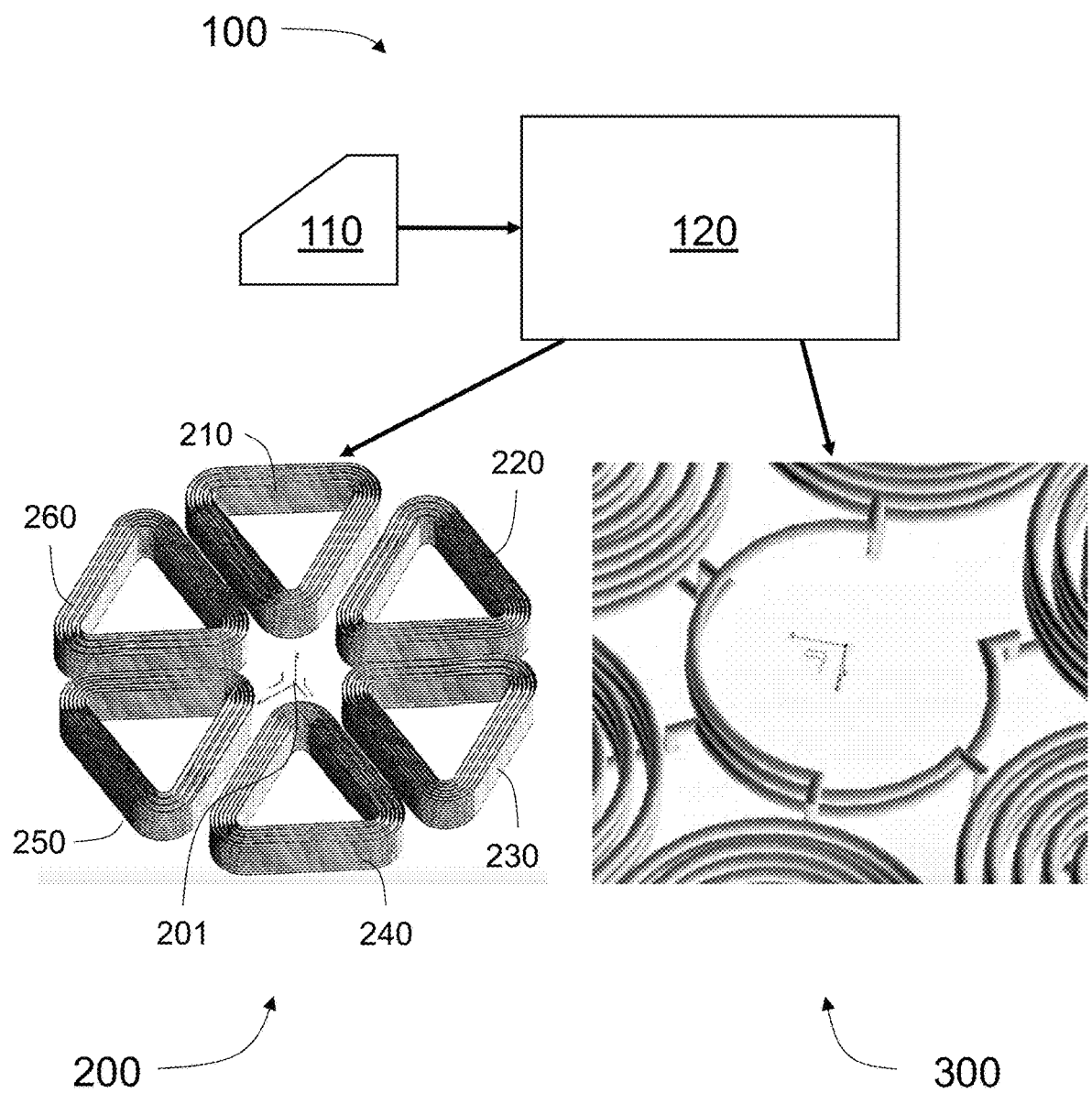
FIG. 1 illustrates an embodiment of an apparatus for generating a layout for an additive manufacturing of an electric drive according to the present invention.

FIG. 1 illustrates an embodiment of an apparatus 100 for generating a layout for an additive manufacturing of an electric drive for a disc rotor, wherein the disc rotor is adapted, by an arrangement of permanent magnets, for being driven by a magnetic field generated by the electric drive. The apparatus 100 comprises an input module 110, which is configured to receive one or more input parameters from a user. The apparatus 100 further comprises a generating module 120, configured to generate, from the one or more input parameters, a layout of a plurality of coil structures 200. The plurality of coil structures 210, 220, . . . is adapted to generate the magnetic field for driving the disc rotor, by means of an electric current. The generating module 120 is further configured to generate a layout of a control structure 300. The control structure is adapted to connect the plurality of coil structures 210, 220, . . . with a connector for a supply of the electric current, and to distribute the electric current to the plurality of coil structures.

In this embodiment, the layout of the plurality of coil structures 200 comprises six coil structures 210, 220, . . . , arranged in rotational symmetry around a common center 201. Each coil structure 210, 220, . . . comprises an electric conductor or wire, which forms several concentric wire helices as coil layers of the respective coil structure 210, 220, . . . . For a coil body, and for each coil layer, a respective cross section takes the form of a triangle with rounded corners, such that each coil structure 210, 220, . . . , is located within a sector covering an angle of 60° in a plane around the common center 201. The layout of the control structure 140 in particular connects coil structures 210, 220, . . . on opposite sides of the common center 201. The plurality of coil structures 210, 220, . . . may be entirely or partially included within a support structure, in particular in a dielectric composite material which may be a substrate of a printed circuit board, PCB.

The layout of the control structure 140 comprises a layout for wiring configured to provide a current to the coil structures 210, 220, . . . in a sequence such that a magnetic field generated by the coil structures 210, 220, . . . has a form and time variation adapted to drive the disc rotor. The disc rotor may be placed on top of the support structure.

The apparatus may be configured to include features of the support structure in the layout. The layout admits an additive manufacturing of the support structure, the plurality of coil structures 210, 220, . . . , and the control structure.

Figure 2:
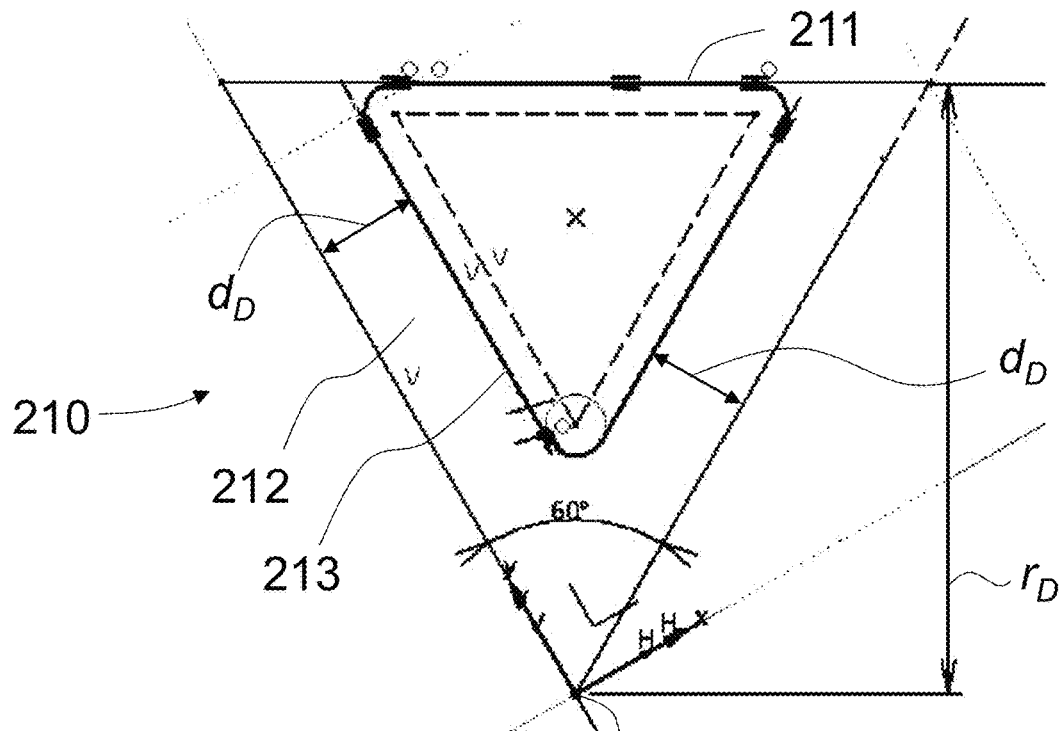
FIG. 2 shows details of generating a layout for a coil structure from input parameters.
Figure 2:
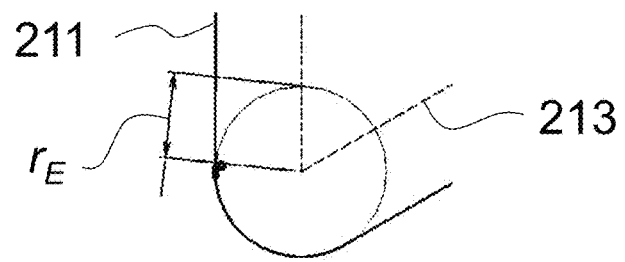
Figure 2:
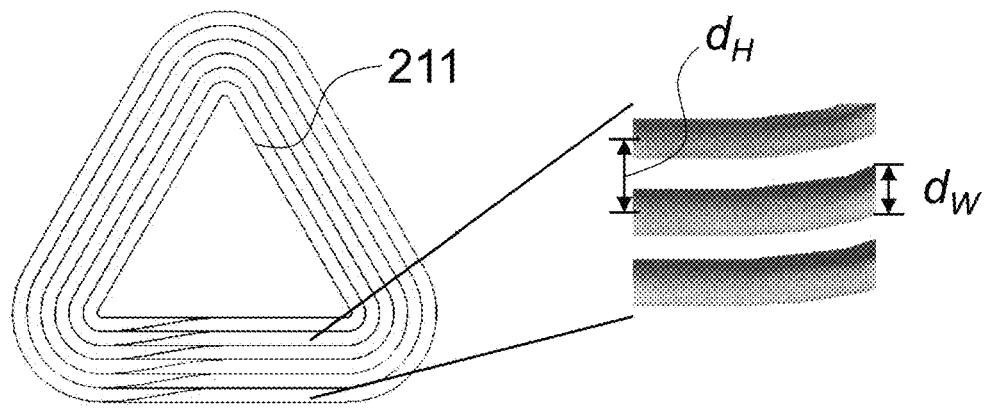

FIG. 2 illustrates how the apparatus 100 may be configured to generate a layout for a coil structure 210 from input parameters.

A part (a) of the figure illustrates how the generating module 120 may generate a projection of a first wire helix or coil layer 211 of the coil structure 210, wherein the projection has a form of a triangle with rounded corners. The first coil layer 211 is located within a triangular sector 212 of a cross section of the electric drive. The triangular sector 212 has a boundary with a vertex positioned at a common center 201. At this vertex, the boundary of the triangular sector 212 includes an angle of 60. The cross section of the full electric drive may be partitioned into further triangular sectors, each having a corresponding tip located at the common center 201, and each comprising a respective further coil structure 220, 230, . . . .

The input parameters may include a radius $r_D$ from a common center to an outer edge of the first coil layer 211, and a minimal distance $d_D$ from the first coil layer 211 to a parallel edge of the boundary of the triangular sector 212.

A part (b) of the figure illustrates how the rounded corners of the first coil layer 211 may be obtained by specifying, as a further input parameter, a radius $r_E$ of a circle of curvature (osculating circle) which is fitted into each corner of the first coil layer 211. The circle of curvature shown here is located on a vertex of a triangle 213, and the projection of the first coil layer 211 may be defined as the set of points which each have the same minimal distance $r_E$ to the triangle 213.

A part (c) of the figure illustrates how a number of projections of further coil layers may be positioned once the first helical coil layer 211 has been defined. For this task, the input parameters may include a helix distance $d_H$, which separates projections of adjacent coil layers. A further input parameter may be a wire gauge, or wire diameter, $d_W$.

Figure 3:
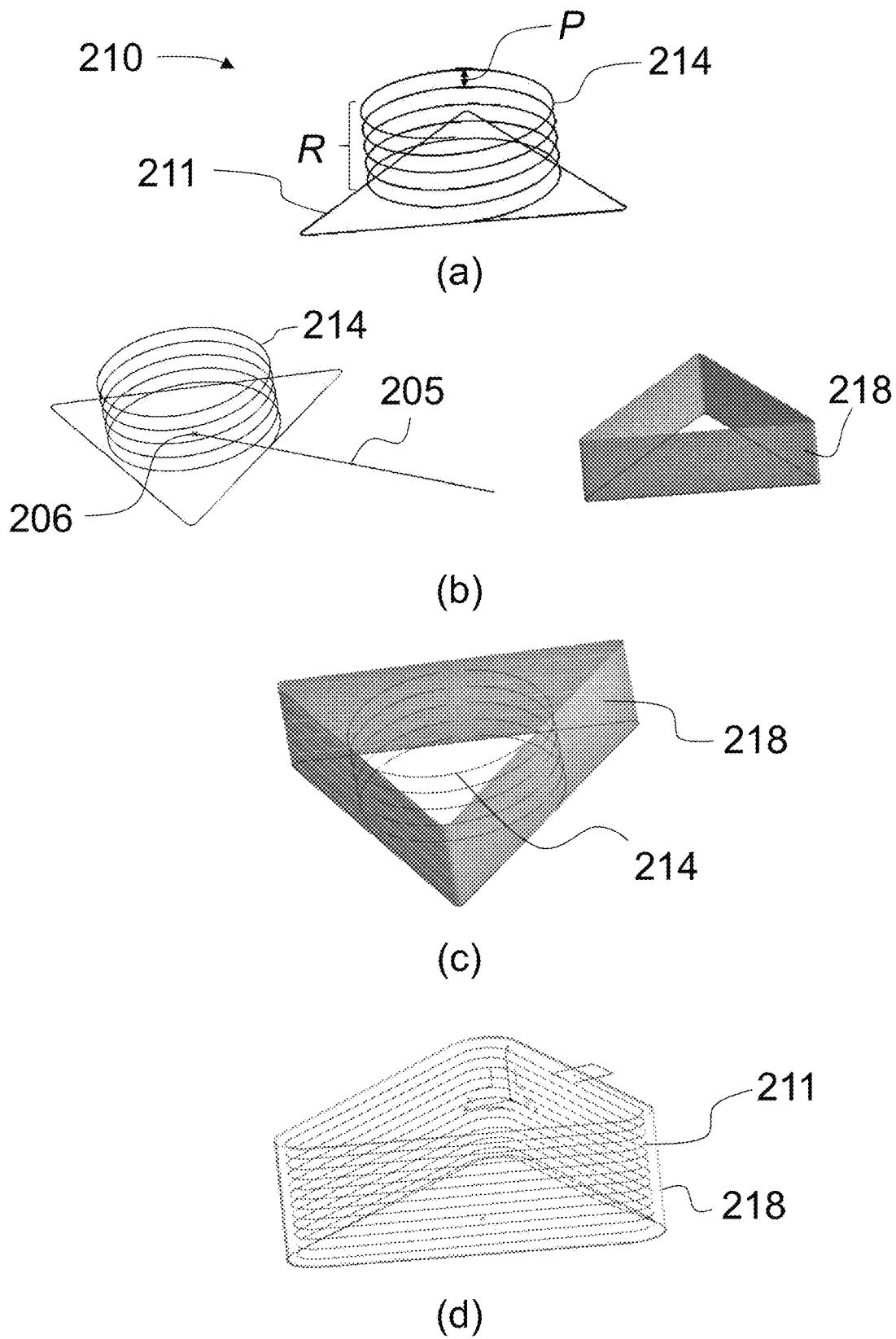
FIG. 3 shows details in a step-by-step generation of a layout for a coil structure.

FIG. 3 illustrates further how the apparatus 100 may be configured to generate a layout for the coil structure 210 from input parameters.

As illustrated in a part (a) of the figure, a circular helix 214 (or round coil) may be generated. The circular helix 214 has an axis perpendicular to the cross section (or plane of projection) of the first helical coil layer 211. In order to fix a radius of the circular helix 214, a projection of the circular helix 214, represented by a circle in the cross section, may be fitted into the projection of the first coil layer 211. The circular helix 214 may then be defined by input parameters including a number of revolutions R and a pitch P.

On a left-hand side of a part (b) of the figure, a rotating projection line 205 is introduced, which runs parallel to the cross section of the first coil layer 211, has an edge passing through a center point 206 of the cross section of the first coil layer 211, and passes at a right angle through the circular helix 214.

On a right-hand side of part (b) of the figure, a coil layer surface 218 including the first coil layer 211, extending in a direction perpendicular on the cross section of the first coil layer 211, is shown. The coil layer surface 218 may be generated as a surface protruding at a right angle from the projection of the first coil layer 211.

Part (c) of the figure illustrates that the circular helix 214 is projected onto the coil layer surface 218. This may be achieved by an algorithm involving the rotating projection line 205.

A part (d) of the figure shows the first wire helix/coil layer 211, which is generated as a result of the algorithm mentioned in the description of part (c). The number of revolutions R and the pitch P of the circular helix 214 also define corresponding quantities of the first coil layer 211.

Figure 4:
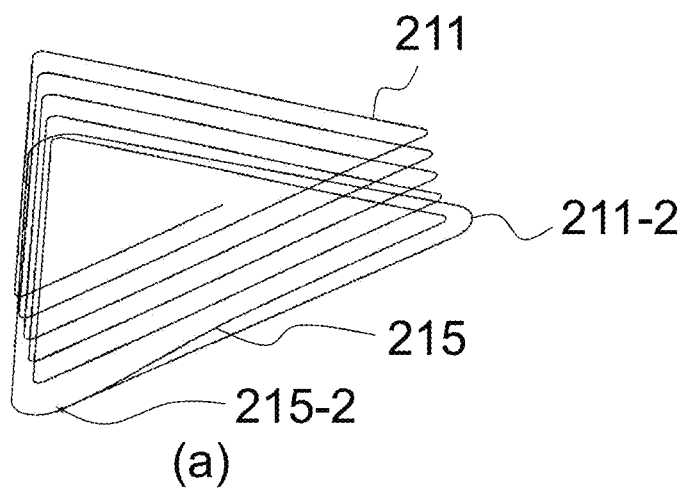
FIG. 4 shows further details in a step-by-step generation of a layout for a coil structure.
Figure 4:
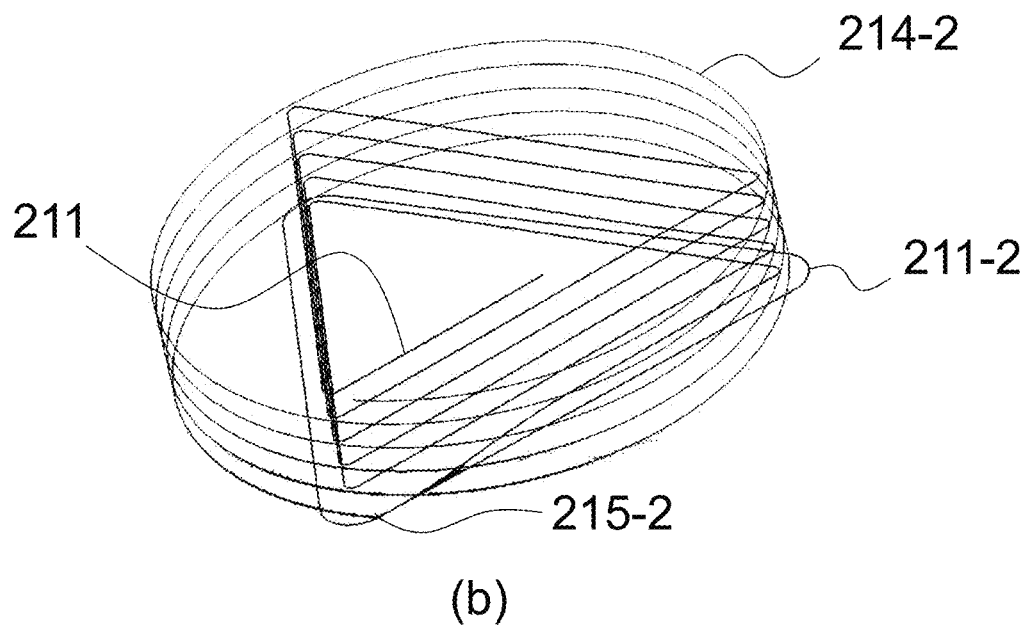
Figure 4:
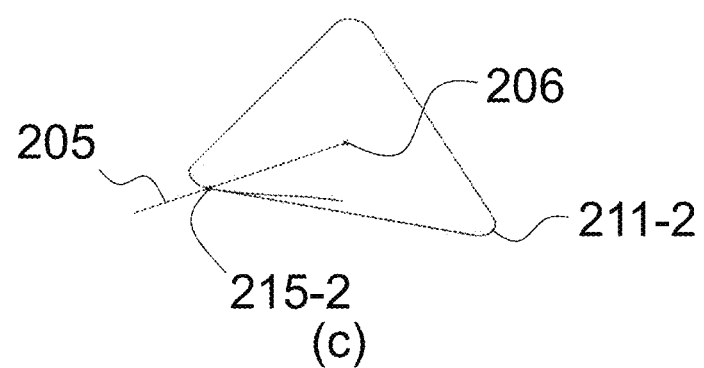

FIG. 4 illustrates further how the apparatus 100 may be configured to generate a layout for the coil structure 210 from input parameters.

A part (a) of the figure shows the first coil layer 211 and a projection of an outer second coil layer 211-2. A connection between the first coil layer 211 and the second coil layer 211-2 may be obtained by fitting a spline function between an end point 215 of the first coil layer 211 and a starting point 215-2 of the second coil layer 211-2.

As shown in a part (b) of the figure, the second coil layer 211-2 may be obtained by first defining a second circular helix 214-2, which starts from the starting point 215-2 and comprises the same number R of revolutions at the same pitch P as the first coil layer 211.

As illustrated in a part (c) of the figure, the second circular helix 214-2 may then be projected to form the second coil layer 211-2 by means of the algorithm involving the rotating projection line 205 (cf. FIG. 3).

Figure 5:
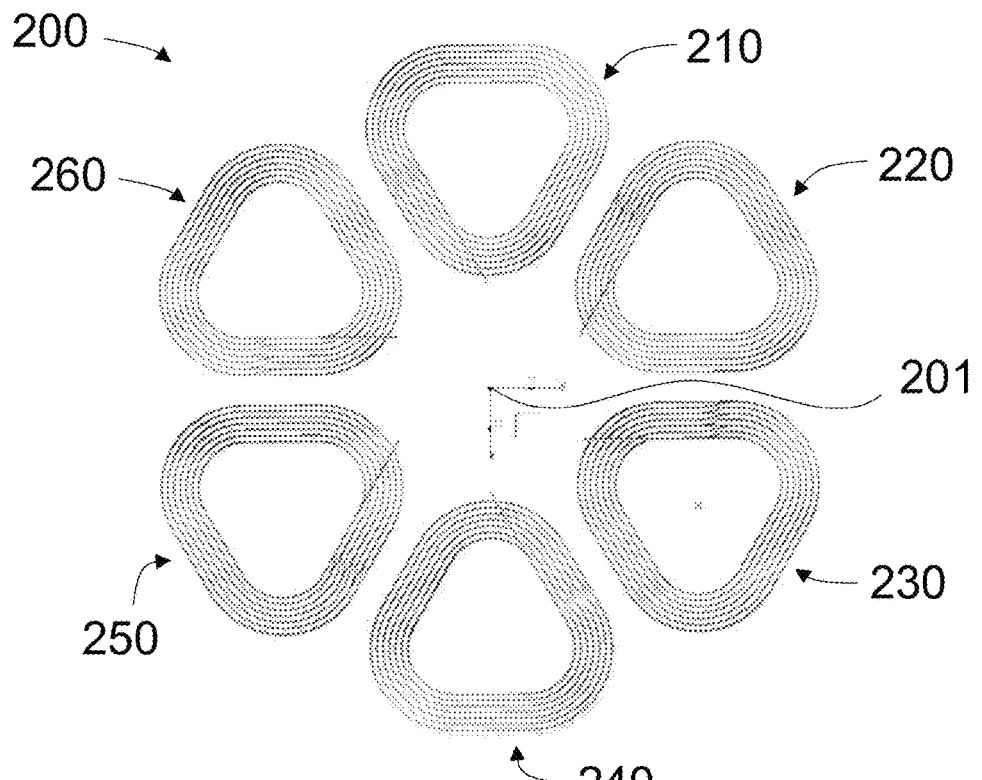
FIG. 5 shows a layout for the plurality of coil structures.

FIG. 5 shows a projection of a layout for the plurality of coil structures 200. The layout comprises six coil structures 210, 220, . . . , arranged symmetrically around a common center 201.

Figure 6:
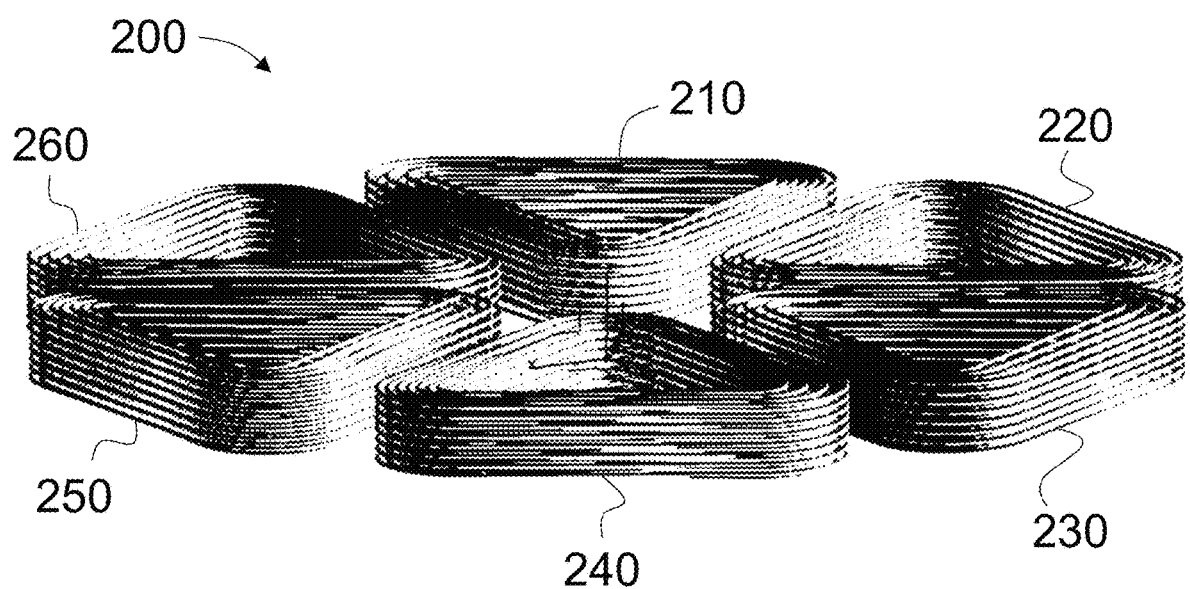
FIG. 6 shows a further aspect of the layout of the plurality of coil structures.

FIG. 6 shows a further aspect of the layout for the plurality of coil structures 200. In some embodiments, the number of coil structures 210, 220, . . . , their arrangements in sectors, and the cross section of coil bodies may be predetermined. In further embodiments, a user may specify these data by input parameters. The input module 110 may, for example, be configured to receive an even integer specifying the number of sectors, and the generating module 120 may be configured to adapt the form of the coil structures 210, 220, . . . accordingly. Further embodiments are configured to provide a choice of cross sections (such as essentially triangular, or essentially round) for the coil structures 210, 220, . . . (or for the coil layers, or coil bodies), which may depend on the number of sectors.

The generating module 120 and/or the input module 110 are advantageously configured to verify that the input parameters collectively yield a physically sensible layout. The apparatus 100 may provide indications of ranges for values of the input parameters, or indicate a predetermined choice of cross sections for the coil structures 210, 220, . . . to the user, e.g. via a display of the input module 110. The range of any one input parameter may be adapted depending on values already provided by the user for other input parameters.

Figure 7:
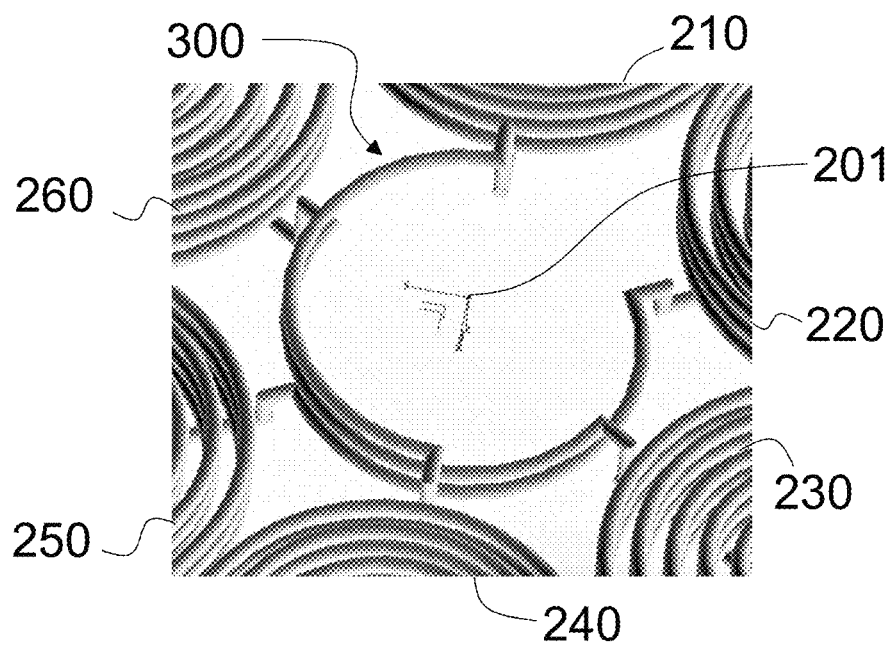
FIG. 7 shows details of a layout of a control structure for wiring of the plurality of coil structures.

FIG. 7 shows details of a layout of a control structure 300 for wiring of the plurality of coil structures 210, 220, . . . . After the input parameters have been provided by the user, the layout for the wiring of the coil structures 210, 220, . . . may be generated automatically. In the present embodiment, the six coil structures 210, 220, . . . are connected pairwise, with each pair occupying opposite positions relative to the common center 201.

Figure 8:
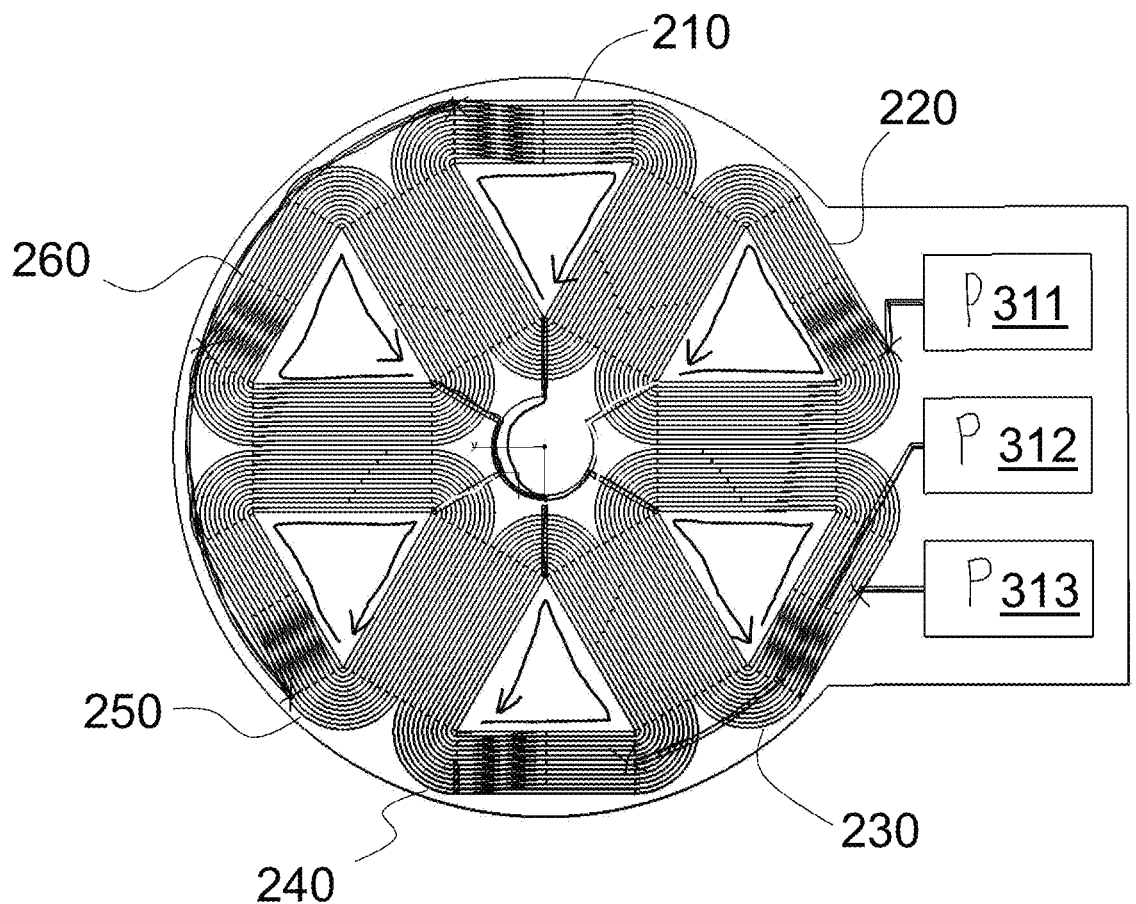
FIG. 8 illustrates a layout of an electric drive.

FIG. 8 illustrates a layout of an electric drive by a cross-section of coil structures 210, 220, . . . and parts of a layout of a control structure 300. The control structure connects the coil structures 210, 220, . . . in pairs, and each pair to a respective connector 311, 312, 313 for a supply of the electric current.

Figure 9:
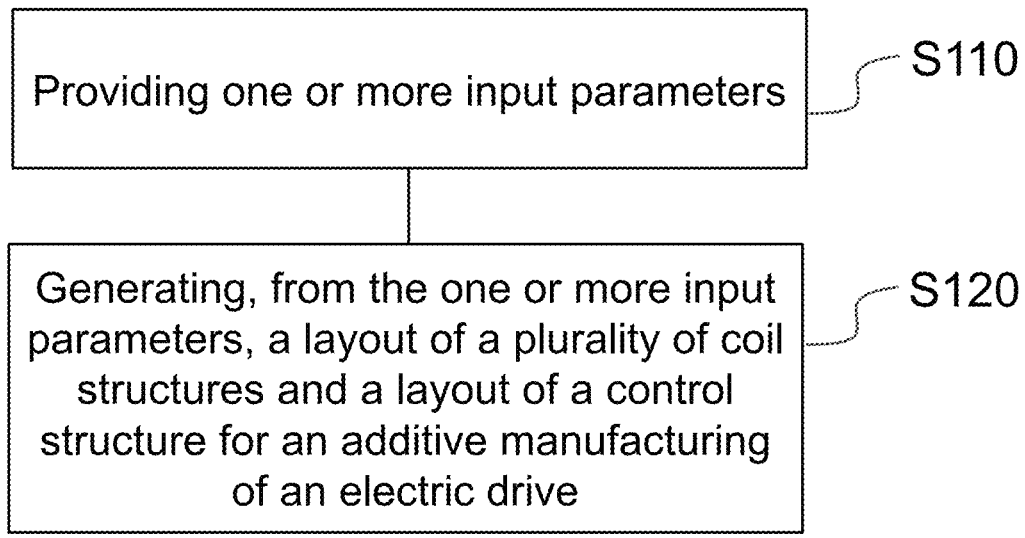
FIG. 9 shows steps of a method for generating a layout for an additive manufacturing of an electric drive.

FIG. 9 shows steps of a method for generating the computer aided design layout for an additive manufacturing of an electric drive for a disc rotor adapted for being driven by a magnetic field. The method comprises providing S110 one or more input parameters. The method further comprises generating S120, from the one or more input parameters, a layout of a plurality of coil structures 200, wherein the plurality of coil structures 210, 220, . . . is adapted to generate the magnetic field by an electric current, and a layout of a control structure 300, wherein the control structure is adapted to connect the plurality of coil structures 210, 220, . . . with a connector 311, 312, 313 for a supply of the electric current and to distribute the electric current to the plurality of coil structures 210, 220, . . . , in order to drive the disc rotor.

Generating S120 the layout of a plurality of coil structures 200 may comprise, for each coil structure 210, 220, . . . , a step of generating a circular helix 214, 214-2, wherein a pitch P and/or a wire gauge $d_W$ and/or a number of revolutions R is determined by input parameters. It may further comprise generating a rotating projection line 205 which is parallel to a cross section of a coil layer 210, wherein the coil layer 210 has a triangular cross section of with rounded corners. It may further comprise projecting the circular helix 214, 214-2 onto a coil layer surface 218 by means of the rotating projection line 205. It may further comprise generating a connection between respective ends (or an end point and a starting point) 215, 215-2 of two consecutive coil layers 211, 211-2 by means of a spline function.

Figure 10:
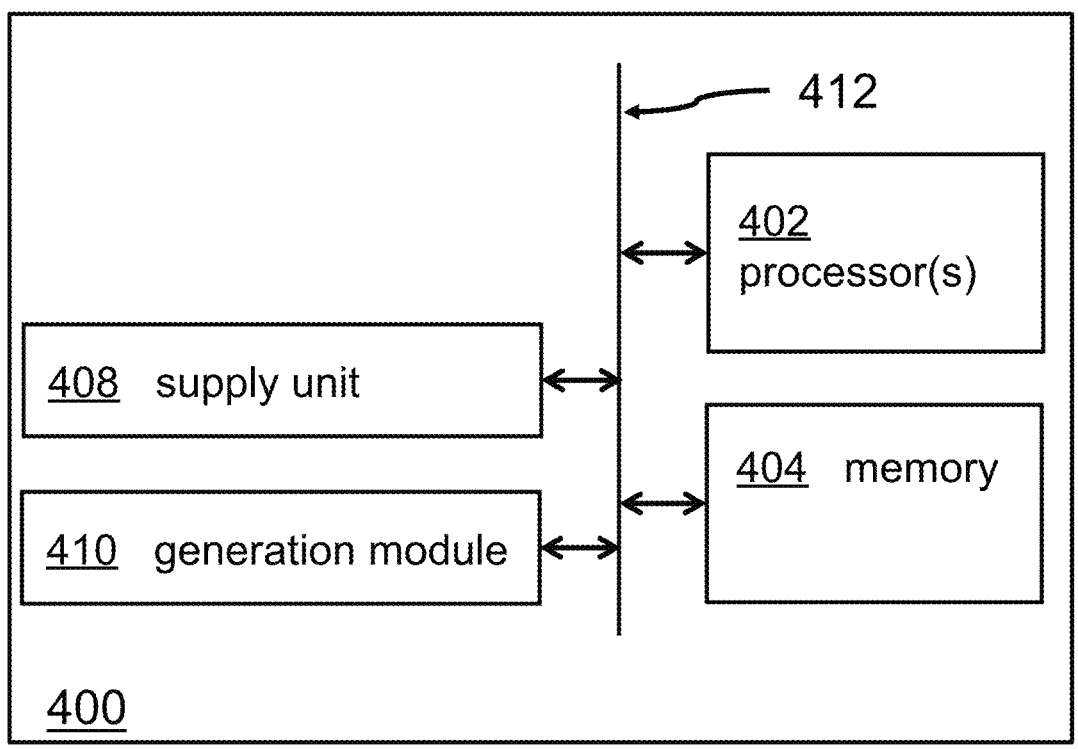
FIG. 10 shows a block diagram of an embodiment of the inventive data processing system for generating a layout for additive manufacturing of an electric device.

FIG. 10 shows a block diagram of an embodiment of a data processing system 400 (e.g. a computer) for generating a layout for additive manufacturing.

The system comprises a processor 402 and a memory 404, communicatively coupled to the processor 402 via an exemplary internal bus system 412. The memory 404 stores program code portions that, when executed, enable the processor 402 to provide the following functions: providing one or more input parameters through a supply unit 408, generating based on the one or more input parameters a layout by generation module 410. The layout includes a layout of a plurality of coil structures, wherein the plurality of coil structures is adapted to generate the magnetic field by an electric current, and a layout of a control structure. The control structure is adapted to connect the plurality of coil structures with a connector for a supply of the electric current, and to distribute the electric current to the plurality of coil structures in order to drive the disc rotor. Thus, the method of FIG. 9 may be implemented on this data processing system 400.

The generation (or computing) module 410 and/or the supply unit 408 can optionally be part of the processor(s) 402. The supply unit 408 may further include transmission unit (for output) and a receiving unit (as input) and can be realized by a network interface (e.g., for wired or wireless communications) that may be utilized for the communication or data exchange.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the wavelength ranges of the sensors, functioning or arrangement of individual elements stated in an exemplary embodiment without leaving the scope of the invention, which is defined by the claims and their legal equivalents, such as further explanations in the description.

LIST OF REFERENCE SIGNS 100 apparatus
110 input module
120 generating module
200 layout of coil structure
201 common center
205 rotating projection line
206 center point of coil structure (or of coil layers of a coil structure)
210, 220, 230, . . . coil structures
211, 211-2 coil layers
212 triangular sector
213 triangle
214, 214-2 circular helices
215, 215-2 end/starting points
218 coil layer surface
300 layout of control structure
311, 312, 313 connectors
S110, S120 steps of a method

What is claimed is:

1. An apparatus for generating a layout for an additive manufacturing of an electric drive for a disc rotor adapted for being driven by a magnetic field, the apparatus comprising an input module, configured to receive, from a user, one or more input parameters,
a generating module, configured to generate, from the one or more input parameters,
a layout of a plurality of coil structures, wherein the plurality of coil structures is adapted to generate the magnetic field by an electric current,
a layout of a control structure, wherein the control structure is adapted to connect the plurality of coil structures with a connector for a supply of the electric current, and to distribute the electric current to the plurality of coil structures in order to drive the disc rotor, and wherein each coil structure comprises as coil layers one or more concentric wire helices, and wherein the generating module is configured to generate each wire helix based on a projection of a circular helix onto a coil layer surface by means of a rotating projection line which is located parallel to the cross sections of the wire helices.

2. The apparatus according to claim 1, wherein the generating module is further configured to generate, based on the layout of the plurality of coil structures and on the layout of the control structure, instruction data for an additive manufacturing device.

3. The apparatus according to claim 2, wherein the additive manufacturing device is a multi-material jetting printer.

4. The apparatus according to claim 1, wherein the input parameters comprise one or more of the following:
a wire gauge or wire diameter,
a pitch or wire inclination,
a number of windings,
a radius or diameter of a cross section of a coil structure, or of a coil layer of a coil structure,
a distance between coil structures, or between two coil layers of different coil structures,
a number of coil layers of a coil structure,
a distance between coil layers of a coil structure.

5. The apparatus according to claim 1, wherein each wire helix has a cross section of a triangle with rounded corners.

6. The apparatus of claim 5, wherein for each coil structure the generating module is configured to generate a connection between respective ends of two consecutive concentric wire helices by means of a spline function.

7. The apparatus according to claim 1, wherein the plurality of coil structures is divided into pairs, and wherein the control structure comprises a wiring which links, for each pair, a first member of the pair to a second member of the pair and to the connector for the power supply.

8. A method for generating a layout for an additive manufacturing of an electric drive for a disc rotor adapted for being driven by a magnetic field, the method comprising the steps:
providing one or more input parameters,
generating, from the one or more input parameters,
a layout of a plurality of coil structures, wherein the plurality of coil structures is adapted to generate the magnetic field by an electric current,
a layout of a control structure, wherein the control structure is adapted to connect the plurality of coil structures with a connector for a supply of the electric current, and to distribute the electric current to the plurality of coil structures in order to drive the disc rotor,
wherein the step of generating the layout of the plurality of coil structures comprises, for at least one coil structure:
generating a circular helix, wherein a pitch and/or a wire gauge and/or a number of revolutions is determined from the input parameters, generating a rotating projection line which is located parallel to a cross section of a coil layer,
projecting the circular helix onto a coil layer surface by means of the rotating projection line, and
generating a connection between respective ends of two consecutive coil layers by means of a spline function.

9. The method according to claim 8, wherein the coil layer has a triangular cross section with rounded corners.

10. A machine-readable storage device, with software code stored, the software code being executable on a data processing system to cause the data processing system to perform operations that comprise:
providing one or more input parameters,
generating, from the one or more input parameters,
a layout of a plurality of coil structures, wherein the plurality of coil structures is adapted to generate the magnetic field by an electric current,
a layout of a control structure, wherein the control structure is adapted to connect the plurality of coil structures with a connector for a supply of the electric current, and to distribute the electric current to the plurality of coil structures in order to drive the disc rotor, and
wherein each coil structure comprises as coil layers one or more concentric wire helices, and each wire helix is generated based on a projection of a circular helix onto a coil layer surface by means of a rotating projection line which is located parallel to the cross sections of the wire helices.

* * * * *